US007062305B1

(12) United States Patent
Cameron et al.

(10) Patent No.: US 7,062,305 B1
(45) Date of Patent: Jun. 13, 2006

(54) LOCATION IDENTIFYING APPARATUS AND METHOD OF IDENTIFYING THE LOCATION OF A USER

(75) Inventors: John F. Cameron, Los Altos, CA (US); Mark D. Sellers, Santa Clara, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 383 days.

(21) Appl. No.: 10/439,060

(22) Filed: May 15, 2003

Related U.S. Application Data

(63) Continuation-in-part of application No. 09/663,063, filed on Sep. 15, 2000.

(51) Int. Cl.
*H04M 1/00* (2006.01)

(52) U.S. Cl. .................. 455/575.1; 455/572; 455/427; 342/357.03

(58) Field of Classification Search ............. 455/575.7, 455/550.1, 575.1, 573, 572, 571, 556.1, 562.1, 455/90.3; 342/357.03
See application file for complete search history.

(56) References Cited

U.S. PATENT DOCUMENTS

| 3,711,857 | A | * | 1/1973 | Cummings | 342/413 |
| 5,526,525 | A | * | 6/1996 | Minowa et al. | 455/90.3 |
| 5,760,748 | A | * | 6/1998 | Beckingham | 343/765 |
| 5,760,909 | A | * | 6/1998 | Nichols | 342/357.17 |
| 5,929,807 | A | * | 7/1999 | Viney et al. | 342/357.06 |
| 6,031,601 | A | * | 2/2000 | McCusker et al. | 342/145 |
| 6,155,869 | A | * | 12/2000 | Monsef et al. | 439/500 |
| 6,229,478 | B1 | * | 5/2001 | Biacs et al. | 342/357.03 |
| 6,369,755 | B1 | * | 4/2002 | Nichols et al. | 342/357.03 |
| 6,512,928 | B1 | * | 1/2003 | Janky et al. | 455/456.6 |
| 6,628,308 | B1 | * | 9/2003 | Greenberg et al. | 715/764 |
| 6,751,467 | B1 | * | 6/2004 | Cameron et al. | 455/575.7 |
| 6,772,526 | B1 | * | 8/2004 | Crain et al. | 33/296 |

FOREIGN PATENT DOCUMENTS

JP            07012570 A  *  1/1995

* cited by examiner

*Primary Examiner*—Joseph Feild
*Assistant Examiner*—Kamran Afshar
(74) *Attorney, Agent, or Firm*—Jurgen Vollrath

(57) ABSTRACT

In a survey system involving either differential global positioning (DGPS) or robotic total station (RTS) systems, the mobile station includes the radio system in the surveyor pole and either connects the laser reflector system or the GPS to the top of the pole or provides a connector for releasably connecting the laser reflector system or GPS. Electric connections between the GPS or laser reflector system, and the radio system are made either by using the physical connector between the pole and the GPS or laser reflector system, or by providing separate electrical conductors and electrical connectors from the pole to the GPS or laser reflector. In the case of a RTS system the base station includes a GPS for locating the position of the base station. For added convenience, the pole may be formed in sections and the power supply may include an inductive coupling battery charger. Data communications may also take place using wireless technology such as Bluetooth.

46 Claims, 8 Drawing Sheets

LOCATION IDENTIFYING APPARATUS AND METHOD OF IDENTIFYING THE LOCATION OF A USER

Continuation-in-part (CIP) of prior application Ser. No. 09/663,063 filed Sep. 15, 2000.

FIELD OF THE INVENTION

The invention relates to a system for identifying a location on the earth's surface and more particularly to Differential Global Positioning System (DGPS), Geographic Information System (GIS), and Robotic Total Station (RTS) Systems.

BACKGROUND OF THE INVENTION

Several systems and methods exist for identifying the position of a user and for performing surveying tasks in which the position of a mobile station has to be determined to varying degrees of accuracy.

One such system makes use of Global Positioning System (GPS) to determine the location of a mobile station. However, GPS has limited accuracy. As a result, systems have been developed to increase GPS accuracy by establishing a reference and identifying the degree of error, which is then used to correct the readings of other GPS systems. This is referred to as Differential GPS (DGPS). Real Time Kinematic (RTK) precision survey refers to Differential Global Positioning System (DGPS) applications that require centimeter level accuracy. The user establishes a base or reference station, and since the position of the base station can be accurately determined, it can be used to correct errors in GPS signals received at the base station. This error information is then relayed by radio (wireless data link) to a mobile station to provide correction data for GPS signals received by the mobile station. In this way the level of accuracy provided by the mobile GPS is greatly enhanced. Various considerations play into the accuracy of the correction information and versatility of the system, including the latency of the message (how often correction updates are sent) and range of the transmission. Different radio transmission techniques exist, including spread spectrum and narrow band, which display different advantages and disadvantages. In one system, for example, correction information is transmitted once a second in order to reduce the latency of the messages. FIG. 1 illustrates a typical Global Positioning System (GPS) used for surveying. The Global Positioning System (GPS) antenna 100 is mounted on the end of a hand-held survey pole 102. The remaining components of the system are contained in pockets within the backpack 104. For better range performance the radio antenna 106 is elevated to improve the line of sight with the transmitter at the base station (not shown). The antenna 106 is connected to the radio 108 with coaxial cable 110. A user interface device 112 is usually hand held or mounted on the side of the survey pole 102 with a serial interface cable 114 connecting it to the Global Positioning System (GPS) receiver 116. A battery 118 is also contained in the backpack 104 that provides power to the radio 108, Global Positioning System (GPS) receiver 116, the Global Positioning System (GPS) antenna 100, and sometimes also the user interface device 112. In this system the surveyor typically removes the battery 118 from the backpack every night and charges it with an external battery charger (not shown). FIG. 1 illustrates that this conventional system employs many different cables, each of which represents a potential failure point.

FIG. 2 illustrates a more integrated system, the model 4800, that is currently manufactured by Trimble Navigation Limited, of Sunnyvale, Calif. This implementation has integrated into a single enclosure the Global Positioning System (GPS) antenna 200, the Global Positioning System (GPS) receiver (not shown), the radio antenna (not shown), and the radio (not shown). The user interface device 210 remains externally connected to the Global Positioning System (GPS) receiver through an external cable 212. This system is powered with a battery (not shown) that is located at the bottom of the survey pole 214. Power is conducted upwards to the rest of the system through two insulated wires (not shown) that run through the center of the hollow survey pole 214. The top of the survey pole 214 and the electronics housing 220 are complementarily threaded to provide a mechanical connector. The threaded connector contains two concentric electrical contacts that allow the electrical circuit to be completed when the threaded top of the pole engages with the housing 220. Because the electrical contacts are concentric, the circuit is made independent of the final angular orientation of the pole as it is tightened. Power to the user interface device 210 that is clamped on to the side of the pole is transmitted from the battery in the bottom of the pole 214, up to the housing 220, and back down through the external cable 212. When the battery requires charging, the pole is disconnected from the electrical housing and inserted upside down into a separate charging fixture (not shown) that makes electrical contact with electrical contacts in the pole.

In order to further enhance the reliability of the system, it would be desirable to eliminate all external cables. Furthermore, the Trimble system integrally combines the wireless data link (radio) and corresponding antenna, with the Global Positioning System (GPS) receiver and its antenna. This limits the versatility of the system, since different wireless data link technologies are appropriate for different survey activities as will be further explained below. For instance, radio technologies are legislated differently from country to country whereas the Global Positioning System (GPS) is accessible worldwide.

Another surveying system is known as Geographic Information System (GIS) mapping. This is a survey activity that requires accuracy of the order of three meters. These systems also make use of Differential Global Positioning System (DGPS) corrections but they typically make use of publicly available broadcasts such as those made by the United States Coast Guard (USCG) in accordance with the IALA standard using Radio Navigation Beacon (RNB) transmitters. This obviates the requirement for the user to set up a reference station transmitter. The USCG has distributed these transmitters in an overlapping coverage pattern on all coastal and major inland waterways in the US, and is presently in the process of expanding this coverage to include the United States inland landmass. In fact, RNB transmitters are distributed pretty widely internationally. The Radio Navigation Beacon (RNB) transmissions are optimized for range in favor of latency and consequently employ data rates of 200 bits per second on carrier frequencies in the 300 kHz range. The mobile stations of Geographic Information System (GIS) users are equipped with Global Positioning System (GPS) and Radio Navigation Beacon (RNB) receivers to enable them to measure their positions. The surveyor typically mounts the Global Positioning System (GPS) antenna at the top of a survey pole, while the user interface device is either hand held or clamped to the side of the pole. The RNB receiver is typically carried in a backpack (very similar to the arrangement shown in FIG. 1) and the RNB antenna is usually mounted on a separate pole that is secured to the frame of the backpack.

Yet another approach for performing surveying involves the use of Robotic Total Station (RTS) surveyors. Instead of GPS, the mobile stations determine their position relative to a base station by means of laser beams and prismatic reflectors to make precise elevation, angle, and range measurements. The typical separation between the total station (laser head at the base station) and the measurement point (prismatic reflector at the mobile station) is typically 1000 meters or less. The total station is mounted on a stationary tripod and uses interferometry to determine the linear distance to the prismatic reflector. The total station has actuators that can aim the laser and transducers that can measure the corresponding pitch and yaw motion of the laser. The prismatic reflector of the mobile station is typically mounted on the end of a survey pole, remotely located at the point to be measured. The total station has the ability to lock onto the prism, and track it, as it moves to new locations. A two-way, wireless data link is employed between the reflector and the total station to allow the location data of the survey point (calculated at the total station end) to be communicated to the surveyor holding the prismatic reflector at the survey point (at the mobile station). For this application, the wireless data link is optimized for higher data rates and may sacrifice range. The communication path is always line of sight (as required for the laser system) and frequently employs spread spectrum wireless technology. A user interface device is either hand held or clamped to the side of the survey pole that supports the reflector.

SUMMARY OF THE INVENTION

The present invention provides for a system, such as a surveying system, for determining the location of a mobile station. In particular, it provides for a system that is highly integrated, lightweight, low cost, reliable and comfortable to use in the field.

According to the invention, a DGPS or RTS system includes a mobile station in which a radio is housed internal to a survey pole. While the term "pole" will be used in this application, this is to be interpreted as including any elongate housing that can serve as a survey pole or is attachable to extensions to define a survey pole. Eliminating a separate radio enclosure reduces the total weight of the system and also reduces total system cost. The data connection between the radio and Global Positioning System (GPS) receiver may be made internal to the pole thus eliminating external cables. Alternatively, only the power connection may be made via a cable, while the data interface comprises wireless means such as infrared or "bluetooth" technology.

Further, according to the invention, there is provided a radio antenna that is an integral part of a survey pole. The antenna may comprise one or more conductive elements forming laminated layers of the pole, and may be secured to the outside or inside of the pole, or define part of the structural wall of the survey pole. This obviates the need for separate cabling to connect the antenna to the radio. A user interface device may be releasably attached to the pole by means of a connector that provides a mechanical and preferably also an electrical connection to the survey pole, thereby eliminating the need for external data and power cables. Instead, the user interface device may communicate with one or both of the Global Positioning System (GPS) receiver and radio, by wireless means such as infrared or "bluetooth".

Preferably, the Global Positioning System (GPS) antenna and Global Positioning System receiver are releasably connected to the pole using a connector that provides mechanical and preferably also electrical connection to the survey pole. This eliminates the need for external data and power cables.

Preferably the electronics of the system derive their power from a single battery that may be located within the pole, and is preferably rechargeable without requiring removal or disconnection, e.g., using inductive pick-up means. This further simplifies the system and affords a lower cost and easier to operate solution.

Further, according to the invention there is provided a DGPS or RTS mobile station in which all of the wireless data communication means, comprising the radio, radio antenna, system power supply, and associated cabling, are integrated into a single survey pole, with a connector for releasably attaching the Global Positioning System (GPS) components and a user interface device. In the case of a RTS system, the base station may include a GPS receiver for identifying the location of the base station.

The radio (wireless data link), and its antenna, may be implemented in the form of a radio receiver, or transceiver, operating with spread spectrum technology, or narrow band technology, or as a receiver in the 300 kHz spectrum.

DETAILED DESCRIPTION OF THE INVENTION

Figure 3:
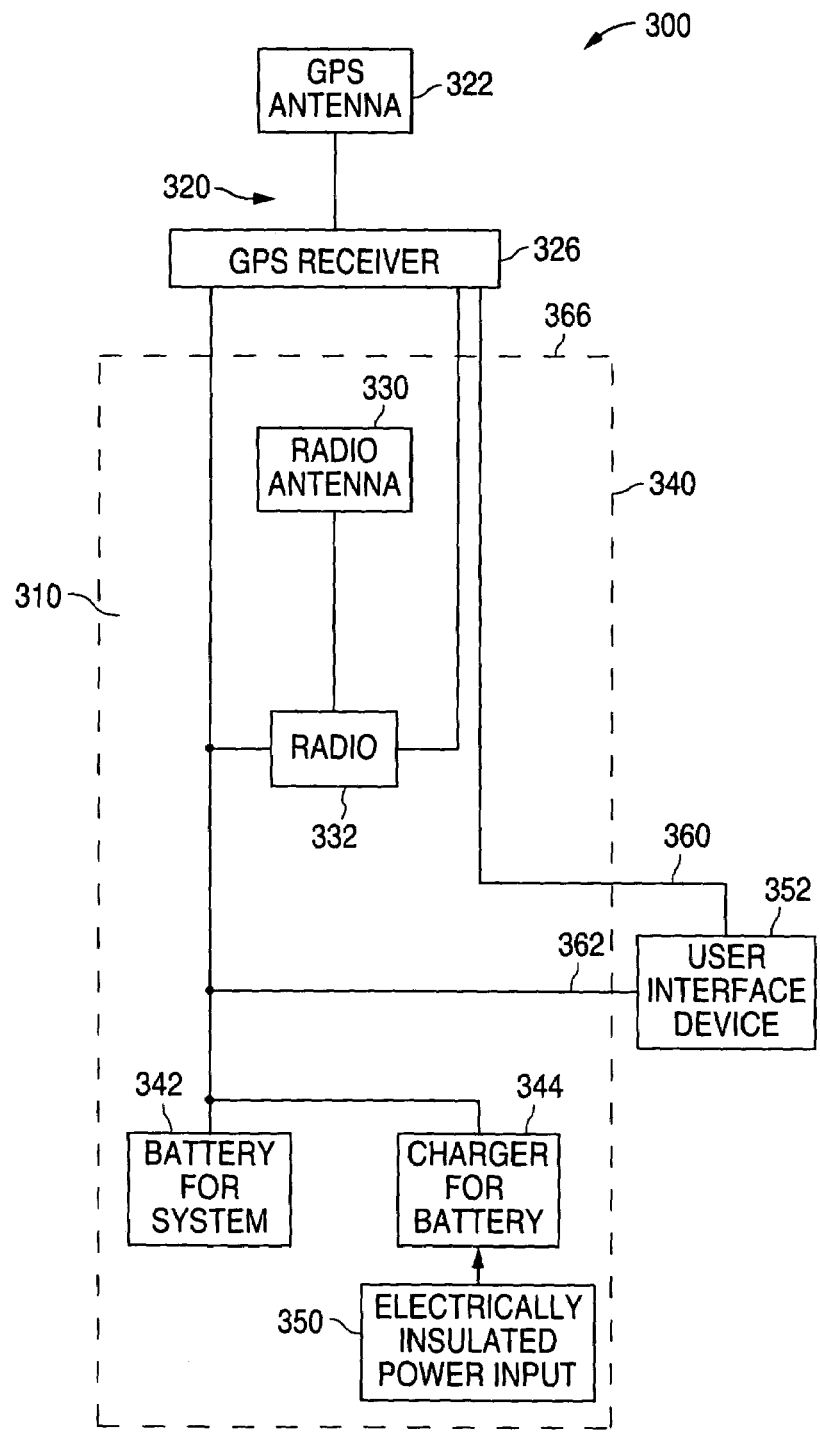
FIG. 3 is a block diagram of a fully integrated system of the present invention for RTK or Geographic Information System (GIS) survey.
Figure 4:
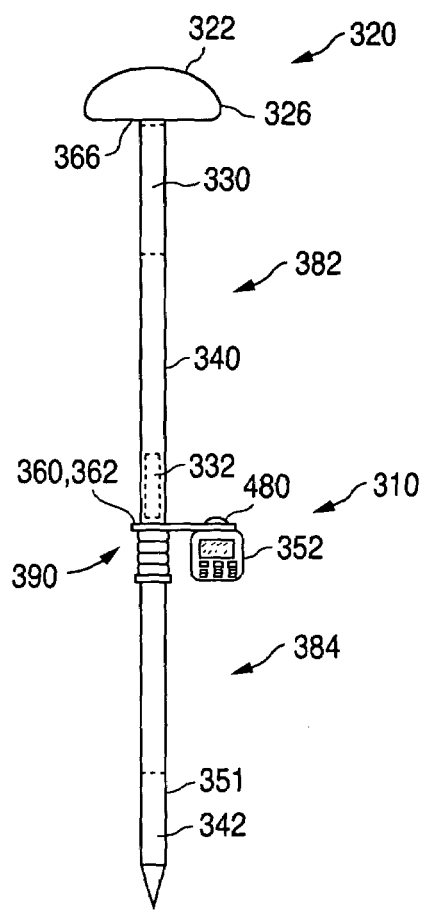
FIG. 4 shows one embodiment of a mobile station of the invention.

FIG. 3 is a block diagram, and FIG. 4 is a three dimensional view of one embodiment of a rover or mobile station of a differential global positioning system (DGPS) of the invention. The mobile station 300 comprises two major systems: a radio or wireless data link system 310 and a Global Positioning System (GPS) 320. The GPS 320 receives GPS signals from a satellite by means of a GPS antenna 322 connected to a GPS receiver 326. This information is corrected using differential correction data received from a base station (not shown) by means of a radio antenna 330 connected to a radio receiver or transceiver 332. For ease of reference, the same reference numerals are used as far as possible in the physical depiction of FIG. 4.

In accordance with one embodiment of the invention, the radio system 310 with its radio receiver or transceiver 332 and radio antenna, is housed within a tubular survey pole 340. In this embodiment, the power supply for the systems 310, 320 takes the form of a single battery 342 and battery charger 344, and is also housed in the pole 340. Access to the power supply is achieved by means of a power input 350, which can be a plug, or, as in this case is housed entirely internally to the pole 340 and makes use of inductive coupling to charge the battery 342. A user interface 352 connects to the radio system 310 and GPS 320 by means of an external connector (not shown) that allows the user interface 352 to connect to conductors 360, 362. In the embodiment shown in FIGS. 3 and 4, the conductors extend within the pole 340.

As shown in FIG. 3, the GPS 320 is external to the pole 340, and is connected to the pole 340 by means of a releasable connector 366, which will be discussed in greater detail below. By keeping the GPS system separate, this embodiment makes it easy to use the pole 340 (with its integrated radio system 310 and power supply) with third party GPS systems. Furthermore, by separating the GPS 320 and radio system 310, the present embodiment also makes it easier to exchange parts for compliance with local requirements, since radio transmissions are typically regulated by national or local rules or laws, while GPS systems are internationally standard.

Figure 5:
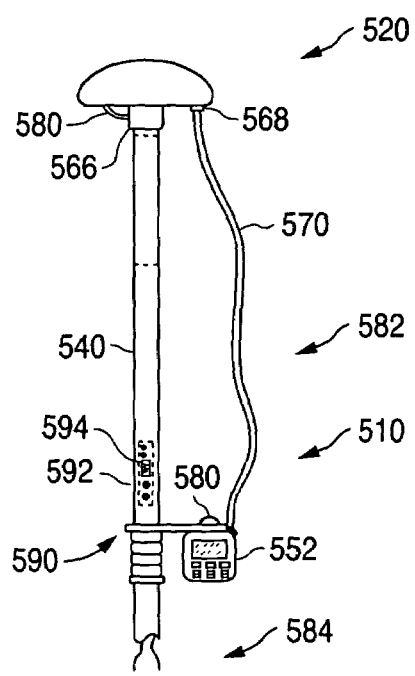
FIG. 5 shows another embodiment of a mobile station of the invention.

It will be appreciated that in an embodiment as shown in FIG. 4, where the conductors 360, 362 pass into the pole 340 via a connector, and run up internally to the GPS receiver, the connector 366 has to be both a mechanical as well as an electrical connection point. In contrast, another embodiment (as illustrated in FIG. 5) has the conductors 570 from the user interface 552 run up the outside of the pole 540. In such an embodiment, the connector 566 need only deal with electrical conductors from the power supply and radio system. Furthermore, insofar as wireless technology, e.g., bluetooth, is used to transmit signals between the radio system and GPS system, the connector 566 need only deal with the physical connection aspect and the power supply conductor. The connector 566 can take a variety of forms. For example, it may comprise a threaded lug. The electrical connection between the conductors 570 from the user interface 552 to the GPS system 520, is performed by an electrical connector 568. Electrical connection between the GPS system 520 and the radio system 510 and power supply is achieved in this embodiment, through a second conductor that connects to a second electrical connector 580. Thus third party GPS systems can be connected quite easily by simply providing complementary electrical connectors 568, 580 that accommodate the GPS system connectors. The embodiment of FIG. 5 also includes a removable insert 592 that adheres to the survey pole 540 in a weatherproof union. The removable insert 592 facilitates the insertion into the pole of the radio 332 and a radio-specific user interface 594 with corresponding buttons, light emitting diodes or a channel display.

Figure 6:
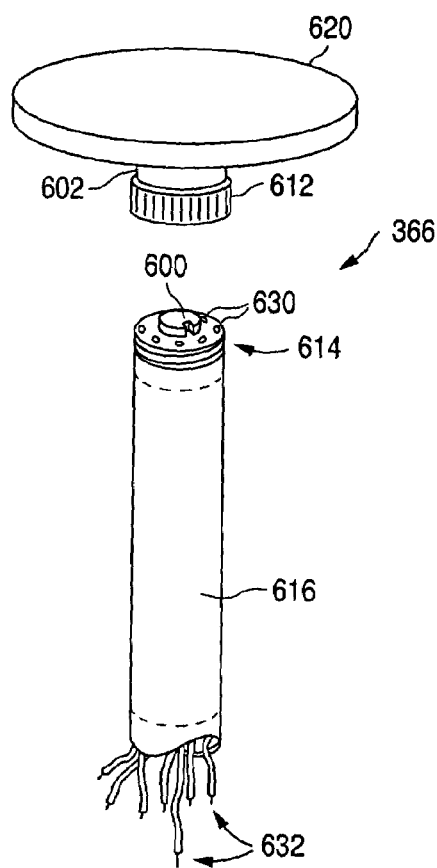
FIG. 6 is a three dimensional view of one embodiment of an electro-mechanical pole interface used in a system of the invention.
Figure 7:
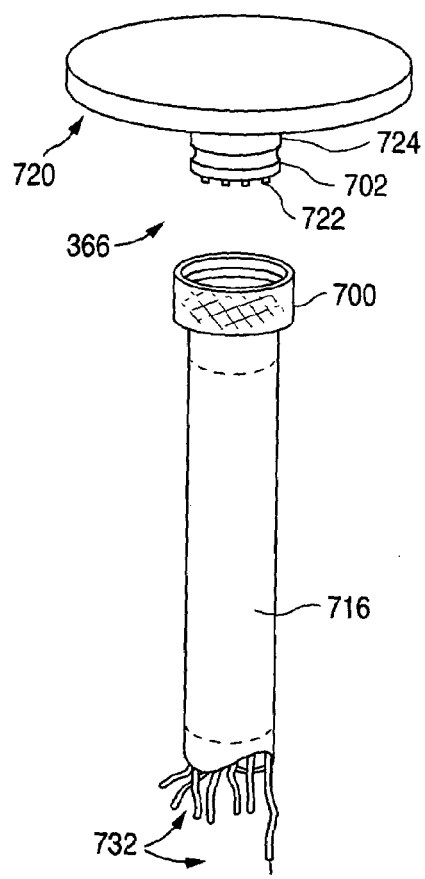
FIG. 7 is a three dimensional view of another embodiment of an electro-mechanical pole interface used in a system of the invention.

The present invention, however, also contemplates other embodiments in which the GPS system is integrated in the pole or attached permanently to the pole, as is discussed in more detail below. In yet another embodiment, either the GPS receiver or the GPS antenna may be included in the pole while the other portion of the GPS system is housed separately in a housing connectable to the pole.

Where the connector 366 is both a mechanical connector and an electrical connector, (e.g., the embodiment of FIG. 4), various embodiments of the connector can be used. Two such embodiments are shown in FIGS. 6 and 7, by way of example only. FIG. 6 illustrates how this interface provides keying means in the form of a recess 600 and a complementary lug (not shown) on the head 602 of the GPS system 620. The recess 600 and lug mechanically constrain the rotational orientation of this connection. The head 602 is provided with a freely rotational and axially movable, internally threaded collar 612 that complementarily engages the threaded section 614 at the end of the pole 616. Thus the head 602 can be correctly aligned with the end of the pole 616, by means of the recess and lug, whereafter the collar 612 is screwed onto the threaded section 614 to secure the GPS system 620 to the pole 616. Conductive contacts or pins 630 provide electrical connections between power cables and data cables 632, and a complementary connector (not shown) in the head 602. In one embodiment the complementary connector was implemented with spring loaded pins that engaged the contacts 630. In another embodiment the contacts 630 take the form of spring loaded pins that engaged contacts on the head 602.

In the embodiment of FIG. 7, a quick disconnect structure is provided for accomplishing an electro-mechanical interface. This embodiment includes an axially movable, spring-loaded knurled collar 700 which, when pulled down, releases spring loaded ball bearings (not shown) that engage with groove 702 in the head 724 when the head 724 is correctly aligned with the end of the pole 716 (again, a key, e.g., a lug and groove arrangement may be provided to ensure proper rotational alignment). The conductive pins 722 (which, in this embodiment, are spring loaded) on the head 724 are clearly visible, and engage complementary connector contacts (not shown) at the end of the pole 716. The electrical connection between the pins 722 and connector on the pole 716 provide power and data communication between the GPS system 720 and the conductors 732 leading to the user interface (not shown), battery (not shown) and radio system (not shown).

Referring again to FIGS. 4 and 5, it will be noted that both the embodiments include a bubble level 480, 580 to help the user in holding the pole 340, 540 vertically.

The radio antenna 330 (FIG. 3) can also take a variety of forms. For example, in one embodiment the antenna 330 is formed from a conductive element that is wrapped around the outside surface of the tubular survey pole 340, 540. The survey pole in such an embodiment may be made of any material, e.g., aluminum or a carbon graphite or other similar composite to decrease weight while providing strength and rigidity. The conductive element, (or in another embodiment, a plurality of elements), may be any conductive material, e.g., metal foil, or wire, that is wrapped around the pole 340, 540 and is selectively electrically insulated from the pole and the outside world. In yet another embodiment, the radio antenna elements are implemented in the form of orthogonal ferrite cores, wrapped in wire, and centered in a section of the pole that is electrically transparent. In yet another embodiment the, the antenna element or elements are formed as a portion of a conductive survey pole.

In the embodiments discussed above, the radio 332 is mounted inside the hollow survey pole and is positioned near the bottom of the upper segment 382, 582 of the survey pole 340, 540. In both the FIGS. 4 and 5 embodiments, the electrical connection between the radio 332 and the antenna 330 is made internally to the pole 340, 540. This can take the form of internal conductors. Instead, the survey pole 340, 540 may be made of electrically conductive material to define at least one of the conductors, such as the electrical ground potential of the system. In one embodiment the pole is constructed of elongate conductive sections insulated from each other to define the power and data conductors between the antenna 330 and radio 332, and even the power and data conductors from the GPS system to other systems in the pole (e.g., to the battery 342, and radio system 310, and to the user interface 352, 552). In some radio antenna configurations, selective contact between the antenna elements and the grounded survey pole may be desirable, in which case separate conductors may be provided to the various antenna elements.

For ease of transportation, the survey pole may comprise an upper portion 382, 582 and a lower portion 384, 584. An electro-mechanical interface 390, 590 provides electrical continuity for power and data conductors between the user interface device 352, 552 and a bus internal to the survey pole. As mentioned above, the power and data conductors, as well as the bus, may be wholly or partly made of conductive pole material, and thus be integrally formed with the pole.

In the embodiments discussed above, the lower portion of the survey pole 384, 584, contains the battery 342 (or batteries) for the system. The battery 342 is sealed and not accessible to the user. The battery charger circuit 344 utilizes inductive coupling to input power to the battery charger. This allows the battery 342 to be charged in place without dismantling any part of the mobile station 300.

The wireless data link (radio) 332 and associated antenna 330, may be implemented using any suitable technology, e.g., narrow band, spread spectrum, RNB technology. It will be appreciated that in the case of a system in which the radio 332 comprises a Radio Navigation Beacon (RNB) receiver, no separate base station has to be set up. Instead, the mobile station receives satellite correction information from Radio Navigation Beacons. Thus, as in the system described above, the mobile station includes a GPS system to get positional information from a satellite. However, instead of correcting this positional information using a base station that is set up by the surveyor, the mobile station corrects the positional GPS information by making use of signals from the RNBs.

The present invention also extends to Robotic Total Station (RTS). The mobile station of an RTS system includes a radio transceiver for communicating with a base station, and a reflector, e.g., a prismatic reflector for reflecting a laser beam emitted by an RTS base station. Instead of GPS, the mobile station in RTS relies entirely on the location of the base station as a reference and determines its own location (distance, direction, and elevation) relative to the RTS base station by virtue of the laser beam emitted by the base station. The present invention also contemplates the use of a GPS at the base station for identifying the location of the base station. Any one or more of the techniques discussed above with respect to the mobile station, could be incorporated in a RTS base station to provide for a convenient GPS solution for the base station.

Figure 8:
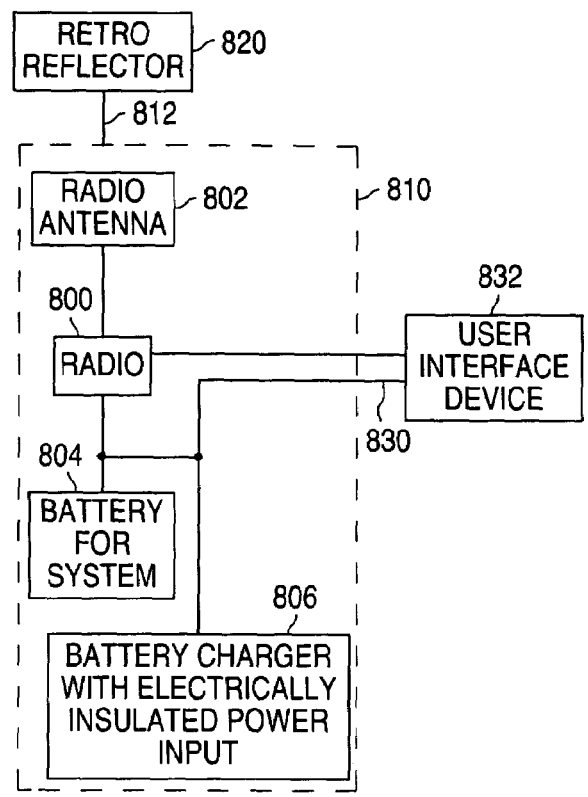
FIG. 8 is a block diagram of a mobile station of a Robotic Total Station (RTS) in accordance with the invention.
Figure 9:
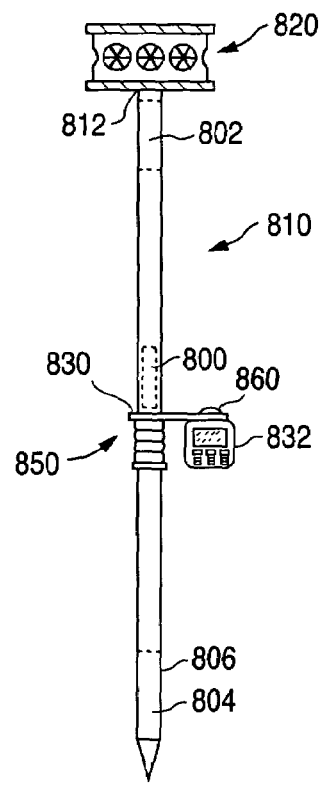
FIG. 9 shows one embodiment of a mobile station of a Robotic Total Station (RTS) in accordance with the invention.

FIG. 8 is a block diagram, and FIG. 9 illustrates a physical embodiment illustrating the invention in respect to a RTS mobile station. Radio 800, radio antenna 802, battery 804, battery charger 806, and their associated cabling, are integrated into a single elongate pole 810, similar to the FIG. 4 embodiment. However, the top of the pole 810 has been adapted to provide a threaded male stud 812 to engage with retro reflector 820 which reflects laser beams directed at it, and is therefore also referred to as a laser reflector. The retro reflector may also include an active prism that provides a light source of its own, as is discussed in greater detail below, with reference to FIG. 15. In the case of an active prism, the light source therefore requires a power supply. The electrical connection can be made between the retro reflector and the systems in the pole, by means of a separate connector, similar to connector 580 discussed with respect to FIG. 5. The present embodiment, however, provides an electro-mechanical connector between the pole and the reflector, as an alternative to using a separate electrical connector. The electro-mechanical connector may take a variety of forms, and may, for example, be similar to the connectors discussed with respect to FIGS. 6 and 7 for the GPS-based system. Furthermore, an electro-mechanical connector 830 enables connection to a user interface 832 in much the same way as was discussed above with respect to FIG. 4. For example, the connector 830 may comprise a series of electrical contacts that are externally accessible through the survey pole wall. In another embodiment, data communication may take place by means of a wireless connection such as Bluetooth. The connector (wireless or physical contact) allows the radio 800 to communicate data directly to the user interface 832. It will be appreciated that a Bluetooth connection would only provide an alternative solution for data communications, while the power connection would typically still be by way of a physical connector.

The battery 804 and charger 806, in this embodiment is located near the bottom of the pole 810 to keep the center of gravity low. However other embodiments (both for the DGPS system and the RTS system) can have the battery and charger located at different locations in the pole, such as near the handgrip 850 where the user is best able to control the pivotal orientation of the pole 810. As in the embodiments of FIGS. 4 and 5, a bubble level 860 is provided to visually assist the user in maintaining the pole in a vertical orientation.

Figure 1:
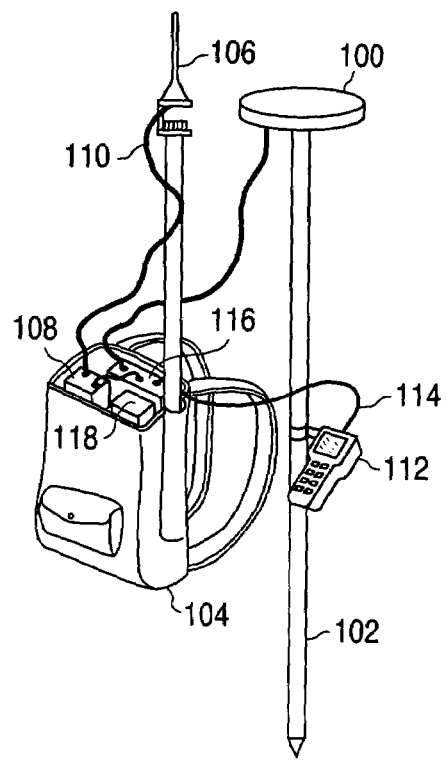
FIG. 1 is a three dimensional view of one type of prior art GPS mobile station.
Figure 2:
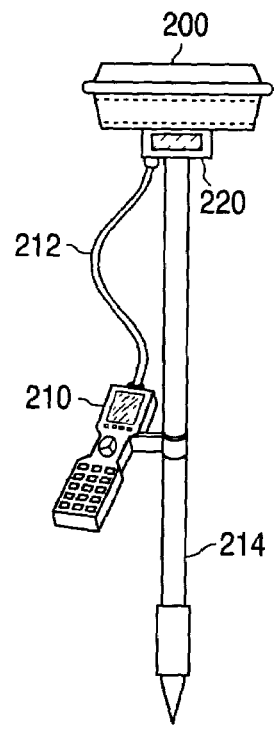
FIG. 2 shows another type of prior art GPS mobile station.
Figure 10:
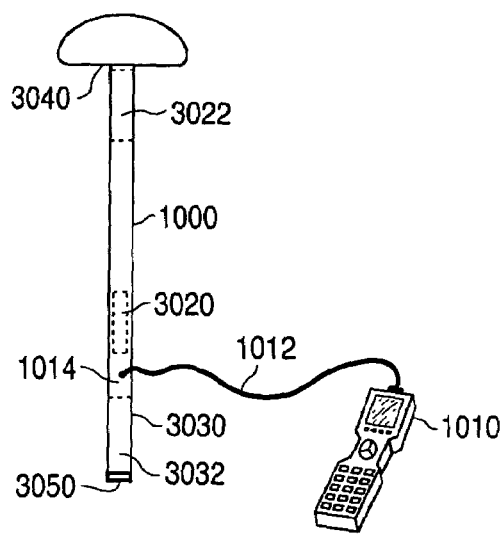
FIG. 10 shows one embodiment of a Geographic Information System (GIS) mobile station of the invention.

FIG. 10 shows another embodiment of a DGPS mobile station. This embodiment includes a shortened pole 1000 constructed for use with a backpack (not shown) as a significant simplification to the prior art configuration shown in FIG. 1. In this embodiment, the user interface 1010 is a handheld device that is electrically connected systems in the pole 1000 using an external cable 1012 with connector 1014. In this embodiment, the radio 3020, radio antenna 3022, battery 3030, battery charger 3032, and electro-mechanical connector 3040 are similarly implemented as in the embodiment of FIG. 4. A female threaded coupling 3050 is provided at the bottom of the pole 1000 such that additional pole segments (fixed length or telescoping) may be added to the pole 1000 in order to elevate the antenna 3022. The length of cable 1012 is chosen to accommodate various pole lengths. It will be appreciated that this method of adding pole segments to increase the height of the system can be applied equally to the Robotic Total Station implementation.

It will, further, be appreciated that the user interface device electronics and display could, instead, be directly integrated into the pole system.

Figure 11:
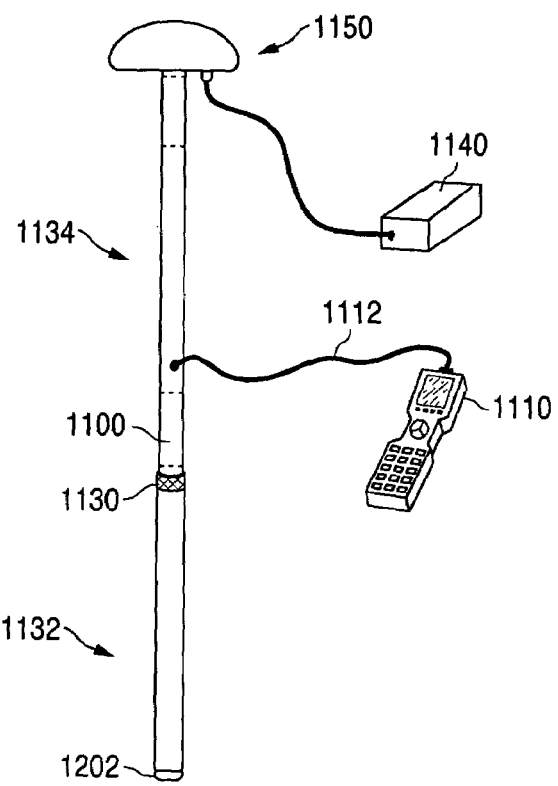
FIG. 11 shows yet another embodiment of a mobile station of the invention.
Figure 12:
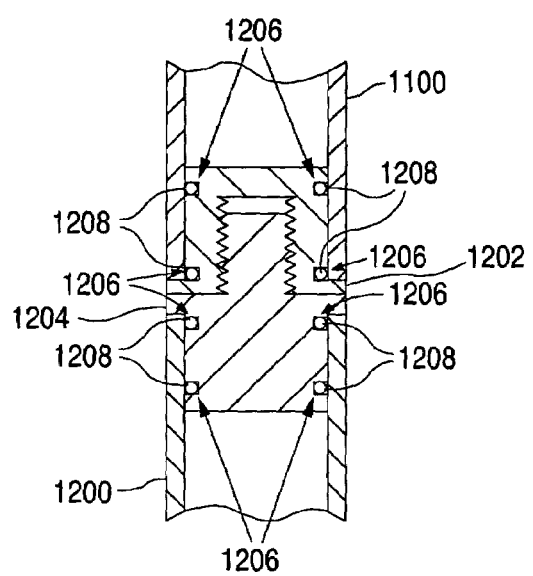
FIG. 12 is a sectional view through one embodiment of a pole coupling used in a survey pole of the invention.

Other embodiments can be implemented without departing from the scope of the invention. For example, FIG. 11 shows a mobile station for a DGPS system, which makes use of a telescoping pole 1100, and a handheld user interface 1110. By using a handheld user interface 1110, the user interface remains independent of the length of the pole (being constrained only by the length of the cable 1112), thereby allowing for multiple pole extensions. Instead of making use of a cable 1112 to connect the user interface to the pole, another embodiment makes use of a Bluetooth connection for data transfer between the handheld user interface 1110 and the other systems in or on the pole. Such an embodiment, further, eliminates the need for a power cable from the user interface to the battery in the pole, by providing the user interface with its own power supply, for example, in the form of one or more batteries. In the embodiment of FIG. 11, the pole extensions are slidably receivable in one another to define a telescoping pole made of two sections. (Clearly the pole could be made in more than two sections). The telescoping pole includes a knurled, internally threaded, sleeve 1130 for securing the telescoping pole section 1132 relative to the upper section 1134. In addition, the lower end of the telescoping pole 1100 includes a connector, e.g., a threaded connector 1202 for connecting further pole sections, as shown in FIG. 12, and as discussed further below. The embodiment of FIG. 11 also provides a separate battery 1140 for the GPS system 1150.

FIG. 12 shows pole 1100 connected to a pole section 1200 by means of complementary threaded end caps or inserts 1202, 1204 for the pole 1100 and pole section 1200, respectively. It will be appreciated that the term pole 1100 is used simply for purposes of consistency and that end caps could be used to connect any pole sections. In the embodiment shown in FIG. 12, the end caps 1202, 1204 are provided with circumferential grooves 1206 cut into their outer surfaces, and O-rings 1208 fitted into the grooves. This allows for cost effective assembly since it provides for simple press fit assembly of the end caps 1202, 1204 to the pole 1100 and pole section 1200, respectively, to supply weatherproof and mechanical integrity. To further secure the end caps it is possibly to epoxy the end caps into the pole and pole section. While in one embodiment the O-rings were eliminated altogether, another embodiment included both the O-rings and the epoxy. This had the advantage that the O-rings channeled the epoxy to the desired contact area and also served to center the end caps during curing of the epoxy. It will be appreciated that in another embodiment the end caps and pole and pole sections could be very precisely machined to ensure a weatherproof seal with only a press fit connection, thereby eliminating the O-rings altogether. However, such an embodiment would entail far greater cost associated with the required machining accuracy.

Figure 13:
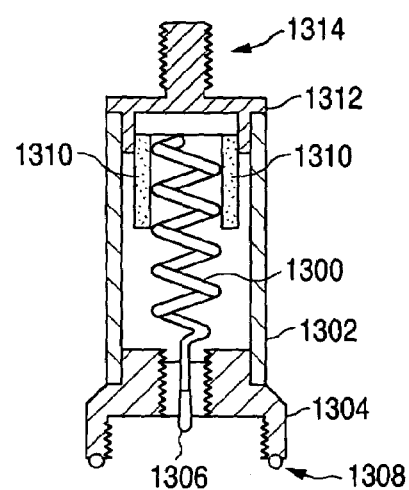
FIG. 13 is a sectional view of one embodiment of part of a RTS mobile station of the invention showing a radio antenna and coupling.
Figure 14:
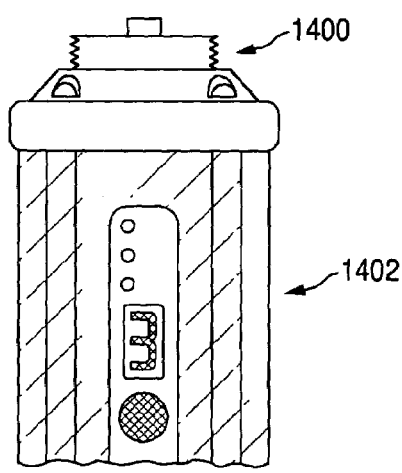
FIG. 14 shows one embodiment of part of a RTS mobile station of the invention with complementary coupling to the part of FIG. 13.
Figure 15:
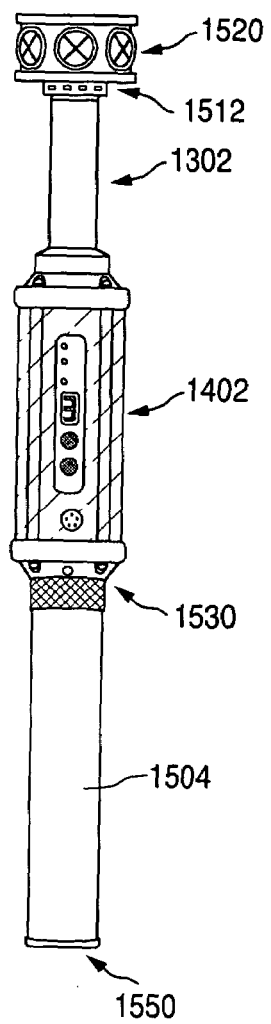
FIG. 15 shows one embodiment of a RTS mobile station of the invention.

It will, generally, be appreciated that the various elements of the invention can be implemented in different ways without departing from the scope of the invention. For example, the radio antenna can take the form of a foil wrapped on the inner or outer wall of the pole or integrated into the pole as part of the pole. In the case where the antenna is not exposed to the outside, it will be appreciated that the pole has to be made of a RF-transparent material such as fiberglass, Kevlar, etc. Instead of a foil or sheath-like antenna, the radio antenna can be any conventional antenna that is mountable within the antenna pole, as shown in FIG. 13. In this embodiment, the pole is formed in two sections that connect to each other through a connector. The radio antenna 1300 is mounted in the upper pole section 1302, which forms a housing around the antenna. As shown in FIG. 13, the antenna 1300 is mounted on a machined aluminum base or end cap1304 that has a spring contact 1306 and a lower surface with O-ring 1308 to sealingly connect to a complementary threaded head 1400 on the upper end of the lower pole section1402 (shown in FIG. 14), which constitutes the housing for the radio modem. In this embodiment, the upper pole section 1302 is epoxied to machined end caps 1304, 1312. The antenna is further secured at its upper end by a foam spacer 1310. The upper pole section1302 is closed off by means of the upper end cap 1312 having an upper threaded stud 1314 for receiving a complementarily threaded prism housing (in the case of a RTS system) or a GPS system. (As discussed above, variations of the connector stud 1314 can be implemented depending on the nature of the system being connected thereto). In this embodiment a simple ⅝ inch diameter threaded stud is shown for the stud 1314, and the upper pole section 1302 takes the form of a 1.25 inch diameter fiberglass or Kevlar pole. As is clear from FIGS. 13 and 14, the pole sections 1302, 1402 can be of different diameter and of different material and although they are referred to as pole sections they need not be made from a single pole but can be housings that are connectable to form a pole-like structure. As shown in FIG. 15, the bottom of the pole section 1402 can also have a releasable battery housing 1504 in which the lower pole section and battery housing are releasably connected by means of complementary threaded sections or quick-release elements as discussed above and indicated generally by reference numeral 1320.

FIG. 15 shows, one embodiment of an RTS system making use of a modular configuration as was discussed with reference to FIGS. 13 and 14. The upper pole section 1302 with its antenna is connected to the lower pole section 1402 with its radio modem as discussed above, and the lower pole section is, in turn, releasably connected to the battery housing 1504. The prism 1520 is releasably connected to the upper pole section 1302, thus allowing a variety of prisms to be connected to the pole section 1302. In this embodiment the prism is an active prism that provides a light source (typically light emitting diodes (LEDs) 1512 that provide a light source) that the laser can lock onto and allows the laser to track the RTS mobile station as it is moved.

In one embodiment, the various connectors between the sections include an electrical contact for DC power from the battery or batteries while data is transferred wirelessly using Bluetooth technology.

Figure 16:
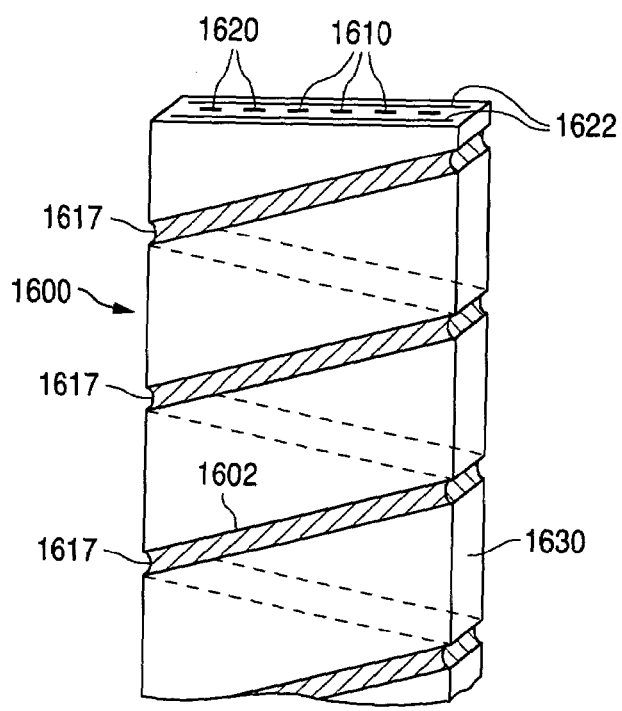
FIG. 16 is a three dimensional view of one embodiment of a radio antenna and conductors used with a mobile station of the invention.

FIG. 16 shows one embodiment of a radio antenna that is mountable in a pole. This embodiment implements the antenna by making use of a multiple layer printed circuit board 1600. The metal layers are etched to define a spiral antenna 1602 on the outside, and electric conductors 1610, 1620, 1622 on the inside. The conductors can comprise both data conductors 1610 (e.g., a RS232 interface) and power conductors 1620, 1622, as in this embodiment, or only data or only power conductors. The power conductors in this embodiment include a power rail 1620 and a ground rail 1622, the latter also serving as a shield between the antenna and the conductors. The insulating PCB material 1630 between the metal traces ensures that the various conductors and antenna element do not short out. In order to connect the conductors on the front and back surfaces of the PCB to define a spiral antenna, connections are formed in this embodiment by a technique used by Antenex of 2000 Bloomingdale Road, Glendale Heights, Ill., 60139, in which edges of the PCB are connected with plated through holes 1617 that are subsequently cut in half when the individual antennae are cut out from a multi-antennae PCB plate. Thus the present embodiment provides for a simple approach to providing both the radio antenna and conductors for a pole structure of the invention. It will be appreciated that in such an implementation, the PCB has to run the entire length between the various systems in the pole.

While various embodiments have been discussed above, it will be appreciated that the invention is not limited to the described embodiments, but includes other embodiments, as defined by the claims.

What is claimed is:

1. A mobile station for a survey system, comprising
a housing defining at least part of a survey pole,
a radio system housed in the housing,
a connector for releasably connecting a Global Positioning System (GPS) or laser reflector system,
a user interface, and
a power supply, wherein the connector provides both a physical connection for a GPS or laser reflector system, as well as electrical contacts for electrical connection to at least one of, electronics of the radio system, electronics of the user interface, and the power supply, and
wherein the connector provides electrical connection between the GPS or laser reflector system connected to the connector.

2. A mobile station of claim 1, wherein the connector provides electrical connection between the GPS or laser reflector system connected to the connector, and at least one of the electronics of the radio system, the electronics of the user interface, and the power supply, by means of contacts internal to the pole.

3. A mobile station of claim 1, wherein the laser reflector system connected to the connector comprises an active prism, and wherein the laser reflector or GPS has its own power supply, and data is communicated between the GPS and at least one of the electronics of the radio system, and the electronics of the user interface, using Bluetooth technology.

4. A mobile station of claim 1, wherein the connector includes complementary connector sections with keying information to ensure proper alignment between electrical contacts on the connector sections.

5. A mobile station of claim 4, wherein electrical connections between the two sections are achieved by means of spring loaded pins engaging electrical contacts.

6. A mobile station of claim 4, wherein the connector sections include complementary threaded elements, the one element comprising a threaded end to either the pole or to the GPS or laser reflector system, and the other element comprising an internally threaded sleeve rotatably connected to either one of the GPS or laser reflector system, or the pole, respectively.

7. A mobile station of claim 4, wherein the connector sections include complementary ball and groove elements wherein spring loaded balls mounted on the one section are releasably enageable with a groove on the other section.

8. A mobile station of claim 1, wherein the power supply supplies power to at least one of, the radio system, the GPS or laser reflector system, and the user interface.

9. A mobile station of claim 8, wherein the power supply comprises at least one battery located in the pole, substantially at a user handhold location.

10. A mobile station of claim 9, wherein the handhold location includes a handgrip.

11. A mobile station of claim 8, wherein the user interface is a handheld device.

12. A mobile station of claim 11, wherein the user interface includes its own power supply, and communicates with at least one of the radio system, and the GPS or laser reflector system, using Bluetooth technology.

13. A mobile station of claim 11, wherein the user interface is connected to the power supply and at least one of the radio system, and the GPS or laser reflector system, by means of electric conductors.

14. A mobile station of claim 8, wherein the user interface is physically connected to the survey pole or is built into the survey pole.

15. A mobile station of claim 1, wherein the power supply includes at least one battery and an inductive battery charger for charging the at least one battery by inductive coupling.

16. A mobile station of claim 15, wherein the charger is located in the pole near the bottom of the pole.

17. A mobile station of claim 1, wherein the radio system includes a radio antenna and a radio receiver.

18. A mobile station of claim 17, wherein the radio system further includes a radio transmitter.

19. A mobile station of claim 17, wherein the radio receiver is a RNB receiver and the radio antenna is a RNB antenna.

20. A mobile station of claim 17, wherein the radio antenna includes one of, a metal foil wrapped on an inner or outer surface of the pole, a conductive portion of the pole formed integrally with the pole, and an antenna element mounted in the pole.

21. A mobile station of claim 20, wherein the antenna element mounted in the pole comprises a printed circuit board with metal traces defining the antenna.

22. A mobile station of claim 21, wherein the printed circuit board includes traces defining electrical conductors for at least one of, power conduction, and data communication, between the radio system and at least one of, the power supply, the user interface, and the GPS or laser reflector system.

23. A mobile station of claim 1, wherein the laser reflector system includes an active prism.

24. A mobile station of claim 1, wherein the electrical connection between the GPS or laser reflector system connected to the connector, and the electronics of the radio system, the electronics of the user interface, and the power supply, is achieved by means of at least one external conductor or set of conductors having a connector for complementarily engaging one or more connectors on the GPS or laser reflector system.

25. A mobile station of claim 1, wherein the pole comprises a plurality of separable or telescoping pole sections.

26. A mobile station of claim 25, wherein the sections are provided with complementarily threaded end caps for screwing the pole sections together.

27. A mobile station of claim 26, wherein the end caps are secured to their pole sections by epoxy or by providing a press fit tolerance between the end caps and their pole sections.

28. A mobile station of claim 25, wherein each end cap includes at least one circumferentially extending groove on its outer surface into which is fitted an O-ring.

29. A mobile station of claim 28, wherein the end caps are secured to their pole sections by providing a press fit tolerance between the pole sections and the end caps with their O-rings.

30. A mobile station of claim 29, wherein the end caps are further secured to their pole sections by means of an epoxy.

31. A mobile station for a survey system, comprising
a housing defining at least part of a survey pole,
a radio system housed in the housing,
a Global Positioning System (GPS) or laser reflector system,
a user interface, and
a power supply, wherein the GPS or laser reflector system is electrically connected to at least one of, electronics of the radio system, electronics of the user interface, and the power supply, and wherein all electrical connections are provided internal to the mobile station, and
wherein the GPS or laser reflector system are releasably connected to the survey pole.

32. A mobile station of claim 31, wherein the pole comprises a plurality of separable or telescoping pole sections.

33. A mobile station of claim 31, wherein the power supply comprises at least one battery located in the pole, substantially at a user handhold location.

34. A mobile station of claim 33, wherein the handhold location includes a handgrip.

35. A mobile station of claim 33, wherein the power supply further includes an inductive battery charger for charging the at least one battery by inductive coupling.

36. A mobile station of claim 35, wherein the charger is located in the pole near the bottom of the pole.

37. A mobile station of claim 31, wherein the user interface is a handheld device.

38. A mobile station of claim 37, wherein the user interface includes its own power supply, and communicates with at least one of the radio system, and the GPS or laser reflector system, using Bluetooth technology.

39. A mobile station of claim 31, wherein the user interface is physically connected to the survey pole or is built into the survey pole.

40. A mobile station of claim 31, wherein the radio system includes a radio antenna and a radio receiver.

41. A mobile station of claim 40, wherein the radio system further includes a radio transmitter.

42. A mobile station of claim 40, wherein the radio receiver is a RNB receiver and the radio antenna is a RNB antenna.

43. A mobile station of claim 40, wherein the radio antenna includes one of, a metal foil wrapped on an inner or outer surface of the pole, a conductive portion of the pole formed integrally with the pole, and an antenna element mounted in the pole.

44. A mobile station of claim 43, wherein the antenna element mounted in the pole comprises a printed circuit board with metal traces defining the antenna.

45. A mobile station of claim 44, wherein the printed circuit board includes traces defining electrical conductors for at least one of, power conduction, and data communication, between the radio system and at least one of, the power supply, the user interface, and the GPS or laser reflector system.

46. A mobile station of claim 31, wherein the laser reflector system includes an active prism.

* * * * *